UNITED STATES PATENT OFFICE.

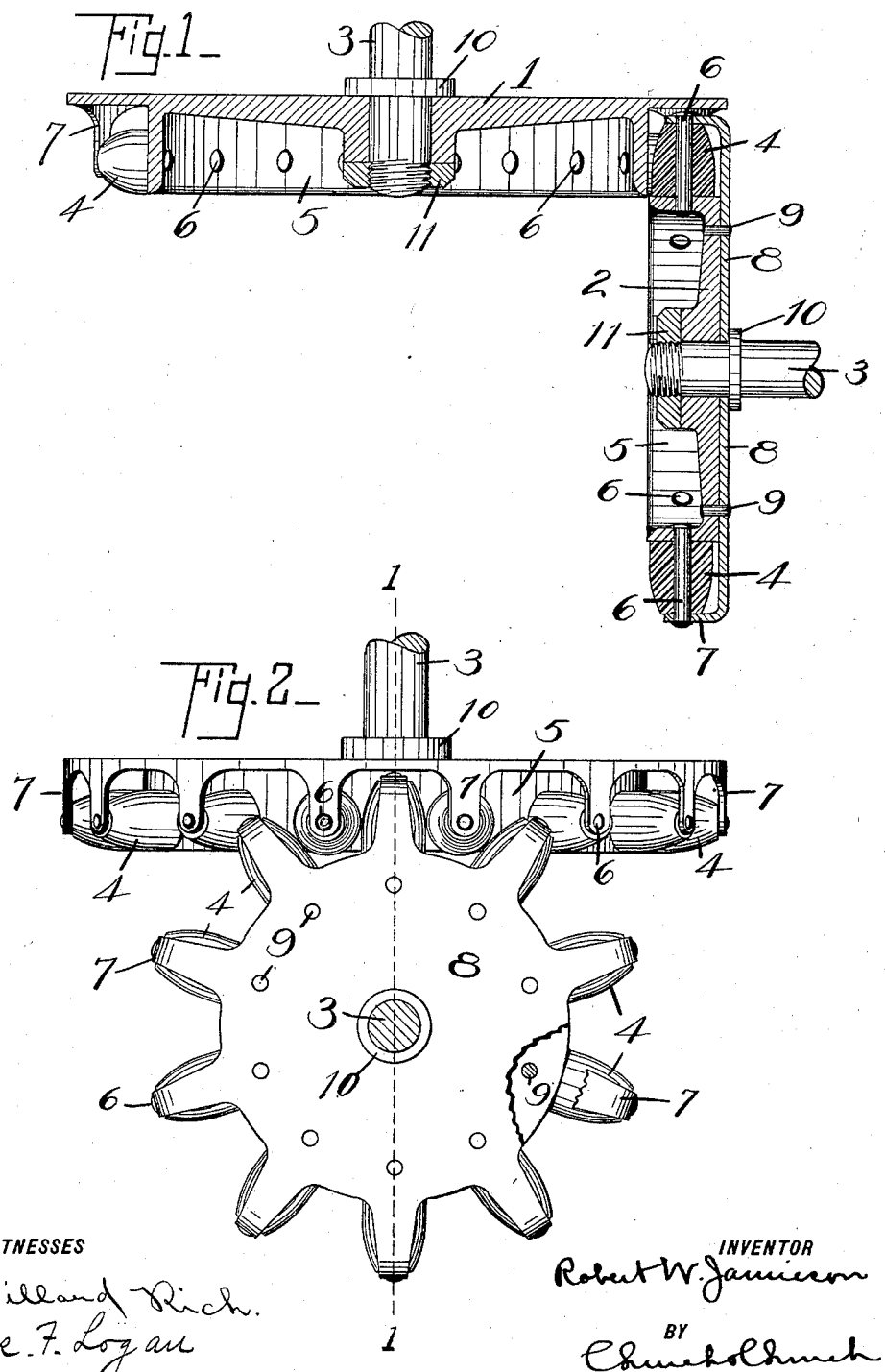

ROBERT W. JAMIESON, OF ROCHESTER, NEW YORK.

GEARING.

SPECIFICATION forming part of Letters Patent No. 613,148, dated October 25, 1898.

Application filed January 17, 1898. Serial No. 666,942. (No model.)

*To all whom it may concern:*

Be it known that I, ROBERT W. JAMIESON, of Rochester, in the county of Monroe and State of New York, have invented certain new and useful Improvements in Gearing; and I do hereby declare the following to be a full, clear, and exact description of the same, reference being had to the accompanying drawings, forming a part of this specification, and to the reference-numerals marked thereon.

My present invention has for its objects to improve the construction and operation of angle-gearing embodying rollers as the engaging teeth or surfaces; and it consists in an improved arrangement of the rollers, whereby not only is the friction between the gears materially reduced, but the construction of the gear as a whole is materially improved and strengthened.

In the drawings, Figure 1 is a sectional view of a pair of gears embodying my improvements, taken on the line 1 1 of Fig. 2; Fig. 2, a plan view.

Similar reference-numerals indicate similar parts.

The gearing herein shown embodies generally two wheels or disks 1 2, secured to shafts 3 3, arranged at an angle relatively and having at their peripheries substantially radially extending rollers 4 4, constituting the engaging teeth, by means of which either wheel is rotated from the other. These rollers are preferably conoidal in shape, with their smaller ends projecting outwardly and their inner ends arranged against the flange 5, formed on the wheel or disk and mounted upon pins 6, which, as shown, pass through the flange 5 and are headed on their inner ends or otherwise firmly secured to the wheel, and their outer ends are secured to supporting-fingers 7, firmly attached to the wheel either by making the fingers an integral part of the wheel 1, as shown, bending said fingers over the ends of the pins, or else (and this construction I prefer) by employing a separate disk 8, of sheet metal, having the fingers formed thereon and bent over the ends of the pins on the wheel 2 and secured thereto by riveting or upsetting the ends of the pins. The plate 8 may be attached to the wheel in any suitable manner; but I prefer to pass rivets or bolts 9 through the plate and the web of the wheel 2, as shown, and, further, to clamp both the plate and wheel to the shaft between a stationary collar 10 on the latter and a nut 11, threaded on the shaft.

The rollers, it will be noted, extend substantially radially of their shafts, and their surfaces are conoidal, and those on the two wheels are arranged and adapted to each other, as shown particularly in Fig. 2, so that they will both rotate on their supporting-pins when moving into and out of engagement with minimum friction, a receding action, and a uniform ratio of velocity, either wheel being capable of use as the driver. By employing the construction embodying the separate plate 8 having the pin-supporting fingers thereon I am enabled to make the wheel 2 of cast metal and the plate of stamped steel and to bend the fingers in suitable dies, so that the parts may be readily assembled.

The gearing described may be used for any purpose desired, but is particularly adapted for use on so-called "chainless" bicycles, as the angles of the two shafts may be varied slightly without materially interfering with the proper operation of the rollers.

While it is desirable that the pins be arranged radially of the shaft, they could be arranged at a less angle relative to the shaft, if desired, without departing from my invention, so long as one side of all the rollers is free and unobstructed.

I claim as my invention—

1. In gearing, the combination with the two wheels or disks arranged at an angle relatively, each having the flange or surface, and the substantially radial pins on the surface, of the conoidal rollers rotating on the pins and the supporting-fingers on the wheel engaging the outer ends of the pins and leaving one side of all the rollers free to engage with the rollers on the other wheel.

2. The combination with a wheel having a flange or surface, and the pins extending radially from said surface, the conoidal rollers journaled on the pins, of the plate secured to the face of the wheel and having the fingers extending over and secured to the outer ends of the pins.

3. The combination with the wheel or disk having the surface or flange, the pins extending substantially radially from said surface, and the rollers mounted on said pins, of the plate secured to the face of the wheel and having the fingers narrower than the rollers extending over the latter and secured to the outer ends of the pins.

4. The combination with the shaft having the collar and the nut thereon, and the wheel mounted on the shaft and having the substantially radial pins on its periphery, and the rollers on the pins, of the plate arranged on the shaft in contact with one face of the wheel and secured with the wheel between the nut and collar, said plate having the fingers extending over and secured to the outer ends of the pins.

ROBERT W. JAMIESON.

Witnesses:
F. F. CHURCH,
G. W. RICH.